United States Patent
Perez et al.

(10) Patent No.: US 6,487,959 B2
(45) Date of Patent: Dec. 3, 2002

(54) FLUID ACTUATING DRIVE FOR SMOOTH ADJUSTING MOVEMENTS

(75) Inventors: Juan Perez, Feldkirchen-Westerham (DE); Martin Voglsinger, Assling (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/792,033

(22) Filed: Feb. 26, 2001

(65) Prior Publication Data

US 2001/0052287 A1 Dec. 20, 2001

(30) Foreign Application Priority Data

Feb. 26, 2000 (DE) .......................................... 100 09 157

(51) Int. Cl.[7] ................................................ F01B 19/00
(52) U.S. Cl. ........................................................ 92/92
(58) Field of Search ................................ 92/92, 91, 90, 92/89

(56) References Cited

U.S. PATENT DOCUMENTS

| | | | | |
|---|---|---|---|---|
| 3,016,884 A | * | 1/1962 | Merriman | 92/90 |
| 3,047,257 A | * | 7/1962 | Chester | 244/215 |
| 3,202,061 A | | 8/1965 | Johnston | |
| 3,375,619 A | * | 4/1968 | Hurkamp | 254/93 R |
| 3,735,671 A | * | 5/1973 | Pennucci | 92/90 |
| 4,446,344 A | * | 5/1984 | Fiedler | 200/81 R |
| 4,712,780 A | | 12/1987 | Ficht et al. | |
| 5,154,108 A | | 10/1992 | McClelland | |
| 5,839,562 A | | 11/1998 | Fischer | |

FOREIGN PATENT DOCUMENTS

| | | |
|---|---|---|
| DE | 1601704 | 8/1970 |
| DE | 34 20 557 C2 | 6/1984 |
| DE | 43 12 503 A1 | 4/1993 |
| DE | 4312503 | 10/1994 |
| EP | 0119435 | 9/1984 |

OTHER PUBLICATIONS

Copy of the International Search Report.

* cited by examiner

Primary Examiner—Edward K. Look
Assistant Examiner—Igor Kershteyn
(74) Attorney, Agent, or Firm—Crowell & Moring LLP

(57) ABSTRACT

A fluid actuating drive for relative translational movement of first and second structural parts has a housing filled with a pressurizing medium, which in its longitudinal direction, runs along a gap that separates the structural parts, and is connected therewith. The width of the gap is dependant upon the relative position of opposing side walls of the housing, which side walls can be moved against one another with a pressurizing agent for the relative movement of the structure, where the side walls are alternately connected to the first and second structural part across the gap.

10 Claims, 10 Drawing Sheets

FLUID ACTUATING DRIVE FOR SMOOTH ADJUSTING MOVEMENTS

BACKGROUND AND SUMMARY OF THE INVENTION

This application claims the priority of German patent document 100 09 157.1, filed Feb. 26, 2000, the disclosure of which is expressly incorporated by reference herein.

The invention relates to a fluid actuating drive which is operated with a hydraulic or pneumatic supply, for mutual displacement of two structural parts.

German patent document DE 4312503 A1 illustrates a folding bellows, with two mounting parts that move relative to one another. When activated, the bellows moves outwards or inwards across its folds. The direction of the forces thus applied on the mounting parts depends upon the operation of the mounting parts or of the components arranged accordingly on them. Hence, a high mechanical guiding force is required for components that extend over a relatively large area transverse to the direction of movement. A hydraulically operated spring bellows is described in German patent document DE 3420557, which is coupled with a pneumatically pressurized cylindrical chamber. The spring bellows is bent in a circular arc, in order to act in conjunction with a swivel bracket with the cylindrical chamber acting as a shock-absorbing element. The spring bellows is introduced into a housing with a circular cross-section. A suitable converter is required for converting the swivelling movement into a translational movement. Apart from this, appropriate mechanical guidance of the components moving against each other is also necessary.

A disadvantage of state of the art actuating drives is that the forces that act upon the structural components as a result of the actuating forces, can be conducted into these components only locally. As a result, comparatively greater forces are generated locally on the connecting points between the actuating drive and the structure, thus making it necessary to install expensive force transmission devices on the structure components concerned.

One object of the invention therefore is to provide a fluid actuating drive for effecting smooth adjusting movements that transmits the forces the concerned components as uniformly as possible.

Another object of the invention is to provide such a fluid actuating drive that is simple, space-saving and light-weight.

These and other objects and advantages are achieved by the fluid actuating drive according to the invention, for moving a first and a second structural part relatively to one another. A housing filled with fluid is arranged along the longitudinal direction of a slot or gap (13) which separates the first and second structure parts. The housing is shaped according to its relative position and its side walls are in contact with the first and second structural parts through its peripheral surface, alternating area-wise. The side-walls can change shape by means of a fluid, so that they move or swivel against each other, to move the structured parts against each other.

In another embodiment, a second housing can be mounted on this first housing, which is also filled with the fluid on both the sides. To change the cross-section of the first housing, fluid is circulated between the first housing and the area between it and the second housing. Adjusting movements in both the directions are possible with this arrangement.

In yet another embodiment, the fluid can be found in flexible hoses with negligible elongation, so that the housing need not be sealed.

An advantage of the invention is that, makes it possible to move large adjustment areas against one another using comparatively less equipment, since conduits are required at only a few points.

Another advantage of the invention is that with the actuator according to the invention both tension and compression movements are possible. Smaller fluid volume movements are required, so that the reservoirs otherwise need for the fluid used can be made small or eliminated. The structural parts can be held at specific positions with minimum energy consumption. Furthermore, by virtue of the invention, smaller conduit lengths are required for the fluid movements; thus, this invention proves to be favorable in respect of weight and total expenditure, such as costs. Another advantage is that a closed system is possible with this invention, which helps eliminate leakage problems almost entirely.

Since the forces are transmitted in a flat manner, the actuating drive helps avoid the concentration of larger forces, as known in the state of the art, which are usually generated in case of structural conduction of forces.

other objects, advantages and novel features of the present invention will become apparent from the following detailed description of the invention when considered in conjunction with the accompanying drawings.

DETAILED DESCRIPTION OF THE DRAWINGS

Figure 1:
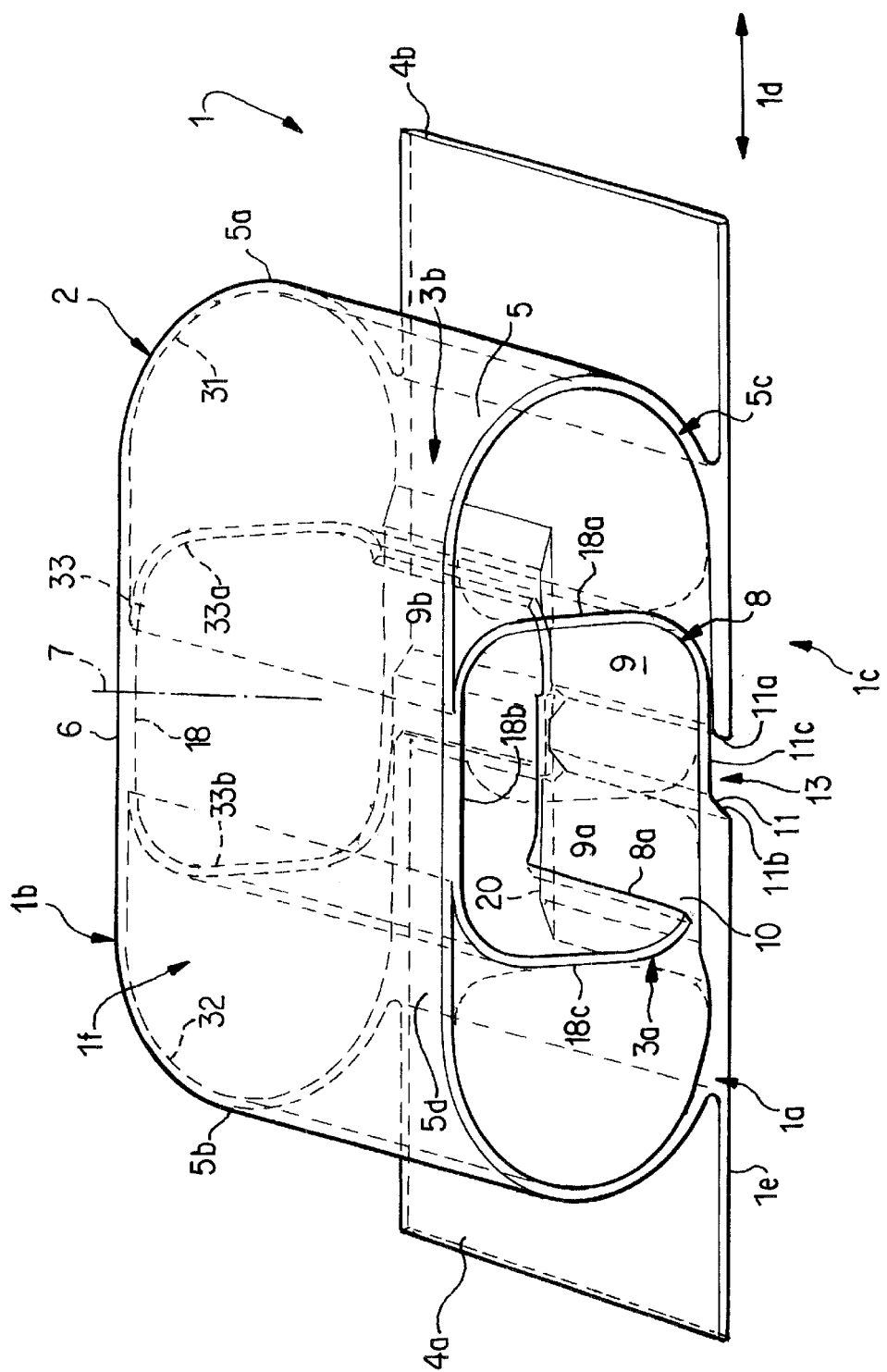
FIG. 1 is a perspective view of a section of the actuating drive according to the invention in its preferred embodiment, where the covered edge lines are shown as a broken line, and moving structure parts have not been shown.

FIG. 1 is a schematic perspective representation of a section 1 of a preferred embodiment of the actuating drive 2 according to the invention. This section 1 in FIG. 1 has a front side 1a and a rear side 1b. An axial or longitudinal direction 1c of the actuating drive 2 runs transverse to the direction of adjusting movement. (Here, the longitudinal direction 1c can run in a zigzag manner and is oriented transverse to the direction of the adjusting movement 1d.) The actuating drive can comprise several sections 1, which are then arranged along the longitudinal direction 1c. An underside 1e of the actuating drive 2 faces the surfaces of the structural parts to be activated and can also form the underside of the structural parts in a special embodiment of the actuating drive 2. The upper side if of the actuating drive 2 is opposite to the underside 1e. The actuating drive 2 is preferably made up of several sections 1 arranged consecutively in the longitudinal direction 1c, each 1 comprising a first area 3a and a second 3b area, as seen in the longitudinal direction 1c.

Every section 1 has a first setting area (or a first structural part) 4a, which has been shown in the left half of FIG. 1, and a second setting area (or a second structural part) 4b shown to the right side of FIG. 1. These may be part of larger units which extend in the longitudinal direction 1c, and which have to be moved against one another with the actuating drive 2, such as an airfoil and a control surface of an airplane. The structure parts 4a, 4b can also be designed as flange parts for mounting the section 1 of the actuating drive 2 with the help of mounting elements 4c on corresponding structure parts to be moved against one another, for example the adjusting surfaces.

The actuating drive 2 in the shown embodiment has an external housing 5, preferably with a uniform cross-section along the longitudinal direction 1c. The two lateral walls 5a, 5b of the external housing 5 run parallel for every section 1 starting from two parallel connecting areas 5c, 5d that extend in the longitudinal direction 1c, from the respective first and second structural or flange parts 4a, 4b and an upper exterior 6. The external housing 5 is seen in the direction of adjusting movement 1d with one end fixed on one structural part and the other end fixed on the other structural part to be moved. The outer housing is designed preferably as a single piece, symmetrically with respect to a vertical plane 7 in the longitudinal direction 1c.

An internal housing 8 is arranged inside the external housing 5, whose cross-section in the longitudinal direction 1c is uniform (preferably a one-piece unit). The internal housing 8 is connected with the external housing 5 in a top part located opposite to the structural parts 4a, 4b. Area-wise, the internal housing 8 is alternately connected with the first structural part 4a and the second 4b in an interdigitated manner. In other words, the internal housing 8 lies inside the external housing 5, with adjacent areas 3a, 3b each structurally connected with a different structural part 4a or 4b on the opposite side, or extends from the structural part. The internal housing 8 thus elevates in the center above the separating line of the structural parts 4a, 4b to be actuated. With this, it forms a base 9, which is formed in every area 3a, 3b in the direction of the adjusting movement partially from a structural part 4a or 4b and partially from the wall of internal housing 8, which protrudes from the other structural part 4b or 4a in such a manner that the inner housing 8 is placed centrally on the structural parts 4a, 4b. In order to bring about a relative adjustment of the structural parts through changes in the cross-section of the internal housing 8, the base 9 is divided in the direction of the adjusting movement; the internal housing 8 forms a free end 8a in the connecting area with the corresponding structural part. The base 9 of a section 1 is made up of a first base 9a in the first area 3a and a second base 9b in the second area 3b.

The transition from the first structural part 4a or the second 4b inside the external housing 5 can be designed in the form of elevations or gradations 10 that extend across the longitudinal direction 1c in a tonguelike-form. Individually, these gradations 10 are shaped in such a manner that they extend across the longitudinal direction 1c and are interlocked with each other in this direction 1c. The formation of the gradation 10 inside the internal housing 8, allows the underside 1d of the relevant area 3a or 3b of the corresponding structural part 4a, 4b to have a section 11 below the gradation 10; this refers to the side lib facing the free counter-side 11a of the opposite structural part 4a, 4b. This side 11 can also be formed as a ramp-shaped inlet (FIG. 1). On operating the actuating drive 2, which effects a change in the cross-sectional shape of the internal housing 8, the opposite side 11a is moved along the section break 11c of section 11 towards the facing side 11b or away from it. Thus, the side 11a and the facing side 11b form a variable width groove or a gap 13 depending upon the operating status of the actuating drive 2. The gap 13 runs in the longitudinal direction 1c preferably in a straight manner and can alternatively also run in a zigzag manner in parts or as a whole.

The structural parts 4a, 4b can be integrated with the internal housing 8 as a single unit, or can be fixed on it with mounting elements. Two gradations 10 are provided within a section 1, as shown in FIG. 1, which run parallel to one another; whereby each gradation 10 starts from another structural part 4a, 4b and extends in the opposite direction of the adjoining one.

Seen from section 11 and across the length direction 1c, the internal housing 8 first runs in the direction of the opposite side 11a or 11b of the structural or flange part 4a or 4b and extends beyond it, where it forms a base 18. From there, the inner housing 8 runs to the upper exterior 6 of the outer housing 5 (thus forming a side wall 18b across the base 18), on which the inner housing 8 is mounted and where it forms an upper wall 18b. From there, this internal housing 8 runs back with one of the side walls 18c opposite to the side wall 18a in the direction of the base 18, and ends with a free end 19 just above the gradation 10 on the side of that particular structural part 4a or 4b, with which the corresponding area 3a or 3b of the internal housing 8 is connected. With a division of base 9, it is therefore possible to move the side walls 18a and 18b relative to one another by activating the actuating drive 2; whereby the free end 19 is moved in a translational motion above the tongue-shaped elevation 10.

The internal housing 8 can have the shape of a predominantly straight pipe running in the longitudinal direction 1c or that of a rectangle with rounded corners.

The described contour of the inner housing 8 is designed in a reverse fashion from one area 3a to the corresponding adjoining area 3b of a section 1 with reference to its movability. The elevation 10 of the adjoining area 3a or 3b of a section 1 begins on the corresponding opposite structural part 4a or 4b. If, for example a first area 3a of section 1, that extends over half of the section 1 in the longitudinal direction 1c, is designed in such a manner that its gradation 10 is formed on the second flange part 4b, this tongue-shaped elevation 10 of the second area 3b is formed on the first flange part 4a. Within a section 1, the internal housing 8 is connected in an area 3a, 3b with the second flange part 4b and in every adjacent area 3b or 3a with the first flange part 4a. The gradations 10 are tongue-shaped; that is, they have lateral surfaces 20 that are transverse to the longitudinal direction 1c. The lateral faces of the adjoining gradations 10 lie opposite and run parallel to each other. Thus, the inner housing 8 is changeable in cross-section, and its connection with the structural parts 4a, 4b brings about a relative movement thereof by interlocking the individual gradations 10, and connecting the internal housing 8 area wise with the first and second structural part 4a, 4b if the cross-section of the housing is changed.

Alternative to the embodiments described above, the actuation drive 2 according to the invention could have no gradation 10 or section 11. In this case, the respective structural parts 4a and 4b merges with the inner housing 8 without this feature. On activating the actuating drive, the counter-side 11a should be movable below the underside 1d, here in an overlapping manner.

The terminations of the inner housing 8 and outer housing 5 on the ends, as seen in the longitudinal direction 1c, are conventional and are designed as per the particular application.

A first hose or a hose-shaped seal 31 is provided in the area of the first flange part 4a between the outer housing 5 and the inner housing 8; it runs in the longitudinal direction 1c for carrying the pressurizing agent (in particular compressed gas or hydraulic fluid). Another hose or hose-type seal 32 is provided in the area above the second flange part 4b between the external housing 5 and the internal housing 8. An intermediate hose 33 is also provided inside the internal housing 8, preferably a first hose 33a and a second one 33b, one on both sides of plane 7. (More than two intermediate hoses 33 can in fact be arranged in the internal housing 8; however, the following description refers to the use of two.) The hoses 31, 32, 33 are made of a material which does not allow any extension, but permits a change in the shape (expansion and contraction) of the cross-section. The hoses 31, 32, 33, 33a, 33b are advantageously designed as flexible shells. Their embodiment should be such that they can carry the pressurizing agent for the actuating drive 2 without leaking.

Figure 2:
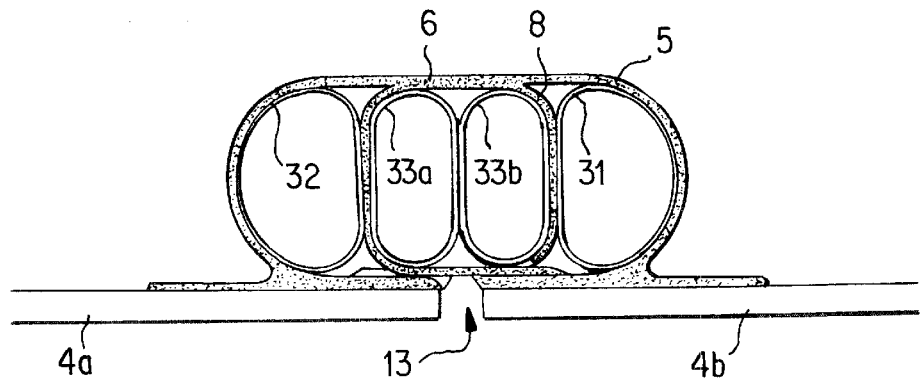
FIG. 2 is a section of the actuating drive according to the invention in the direction of the adjusting movement, where the drive is in a neutral position for the adjusting movement.
Figure 3:
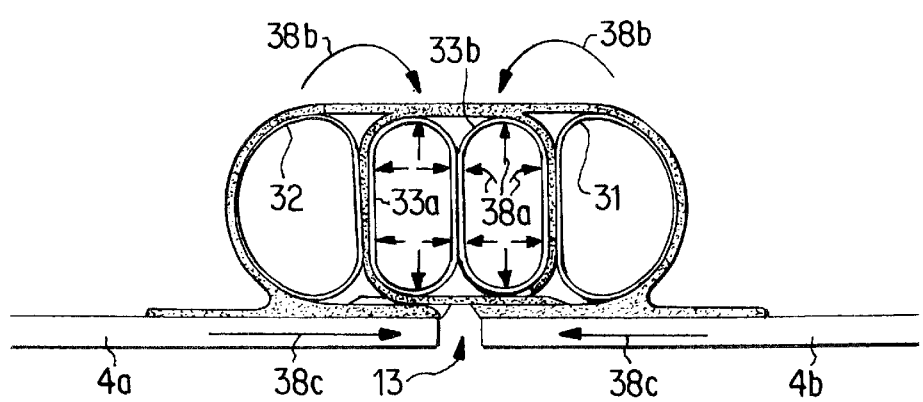
FIG. 3 shows a drawing of the actuating drive in accordance with FIG. 2 with the structural parts activated to be moved together from the neutral position.
Figure 4:
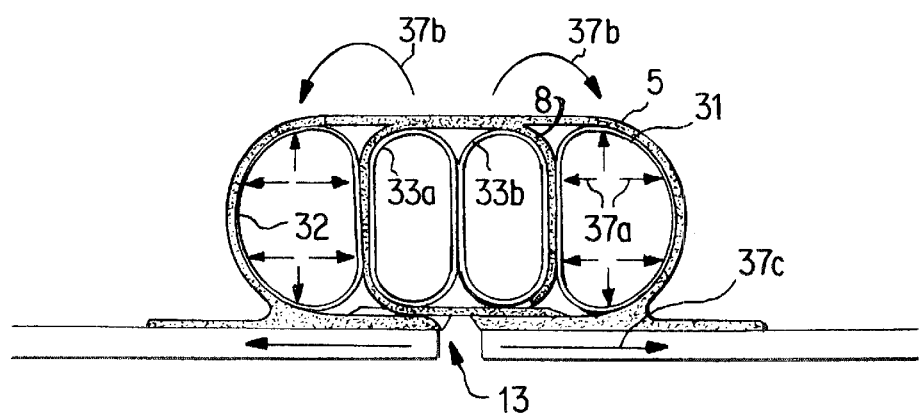
FIG. 4 is a section of the actuating drive in accordance with FIG. 2, with the structural parts activated to be moved away from each other from the neutral position.
Figure 5A:
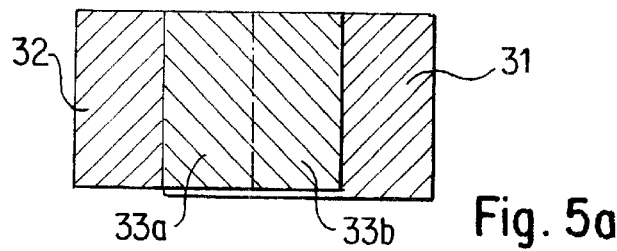
FIG. 5a is a schematic representation of the volume of pressure chambers of a preferred embodiment of the actuating drive of FIG. 1, in the operating status shown in FIG. 2.
Figure 5B:
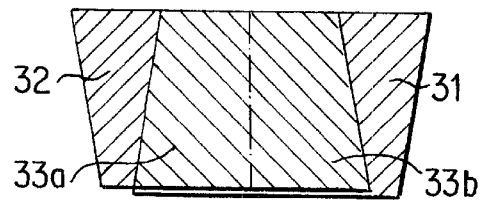
FIG. 5b shows the pressure chamber volume of the actuating drive similar to FIG. 5a in accordance with FIG. 1, in the operating status of FIG. 3.
Figure 5C:
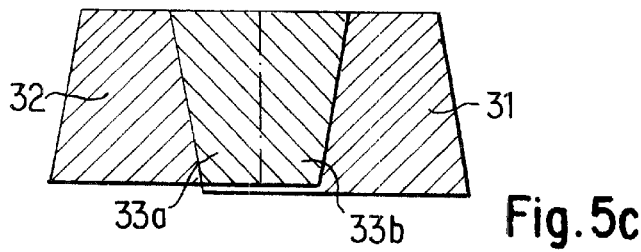
FIG. 5c shows the pressure chamber volume of the actuating drive also similar to FIG. 5a in accordance with FIG. 1 in the operating status of FIG. 4.

The functioning of the actuating drive according to the invention is described below with the help of FIGS. 2 to 6. FIG. 2 is a schematic representation of the starting status, in a condition of equilibrium. FIG. 3 on the other hand shows a closing movement or direction; while FIG. 4 represents an opening movement or direction of the structural parts 4a, 4b to be activated with the actuating drive 2. FIGS. 2 to 4 are sections of the second area 3b of section 1 of FIG. 1.

In the starting status, the interior of the pipes 31, 32, 33a, 33b has a pre-defined reference pressure, with the structural parts 4a, 4b to be moved against each other by activating the actuating drive 2 in a reference or neutral position relative to one another. Advantageously, the same pressure is found in all pipes 31, 32, 33a, 33b. In this position of the structural parts 4a, 4b the groove 13 has a pre-defined size. The cross-sectional surfaces of the pipes 31, 32, 33a, 33b are shown schematically in FIG. 5a, as rectangles with the same area.

In order to move the structural parts 4a, 4b apart (FIG. 4), the pressure inside the intermediate hoses 33a, 33b is reduced and the pressure in the first hose 31 and second one 32 is simultaneously increased, as indicated by the arrows 37a. The pressure increase can take place on the outer housing 5 or on the outer hoses 31, 32 (arrow 37b) by circulating the pressure agent of the inner housing 8 or the first intermediate hose 31 and the second intermediate one 32. Since the material of the hoses 31, 32, 33, 33a, 33b cannot be extended longitudinally, the cross-section of the inner housing 8 changes when the first and second hoses 33a, 33b are pressed—provided these have been provided for. This has been shown in FIG. 3 and schematically in FIG. 5b. The pressurizing agent supplied additionally to the intermediate hoses 33a, 33b causes further expansion of the cross-section of the inner housing 8. This cross-section of the inner housing 8 changes according to the changes in pressure since the hoses 33, 33a, 33b lie close to the inner housing 8 and its material is such that its shape can be changed by the hoses.

If the first hose 31 and the second one 32 are pressed, the size of the cross-section of the inner housing 8 decreases in the area of the flange parts 4a, 4b. The lateral walls 18a and 18b of the inner housing 8 are therefore compressed, whereby the width of the groove or gap 13 (and thereby the distance between the first 4a and the second 4b flange part) is reduced (arrows 37c). This takes place in accordance with the structural or dynamic requirements of the adjusting movements over a predefined or a total length 1c of the actuating drive 2, so that the corresponding structural parts to be moved 4a, 4b are moved closer together.

When the cross-section of the inner housing 8 changes, the movement of the lateral walls 18a, 18c transverse to the longitudinal direction 1c in the height of the upper wall 18b is much less than that on the height of the structural parts 4a, 4b. The increase in size of the cross-section in this lower area is because the inner housing 8 has larger deformation paths in this portion due to the area wise free ends 8a of the lateral wall 18c than the those of the part near the upper wall 18b, which does not show any freely moving areas. Since the lateral walls 18a, 18c are designed as one unit (as seen from the longitudinal direction 1c), the movement of the side wall, e.g., 18c in the area, in which this refers to the free end 8a, is transferred to the corresponding adjoining area 3a or 3b, which does not indicate any free end 8a on this side wall 18c.

The increase in the cross-section of the inner housing 8, particularly near the flange parts 4a, 4b causes a reduction in the width of the groove 13, reducing the distance between the opposite sides 11a, 11b of the first structural part 4a and the second one 4b since the base 9 of the internal housing 8 and that of the area overlapping the corresponding opposite structural part 4a or 4b increases. This increase in the base is area wise, i.e., it takes place through the movement of the corresponding first base 9a to the respective second base 9b in the opposite directions. This is achieved when the opposite side walls 18a and 18c are moved apart by pressing the inner housing 8 that has been shown in FIG. 3 with arrows 38a. The inner housing 8 can be pressed by circulating the pressurizing agent of the outer housing 5 or the outer hoses 31, 32 on the inner housing 8 or the intermediate hoses 33a, 33b. This direction of fluid transfer has been indicated with the arrows 38*b*. In this way, the groove 13 is reduced over the entire length 1*c* of the actuating drive 2 and the structural parts 4*a* and 4*b* are moved closer together (arrows 38*c*). Here, the outer housing 5 assumes a sort of supporting function for the inner housing 8.

The need for hoses can be internalized, if the inner housing is sealed accordingly.

Alternatively, the actuating drive can be designed with only the internal housing 8, which, based upon a neutral condition, operates as a flexible housing by increasing and decreasing the pressing agent.

Figure 6:
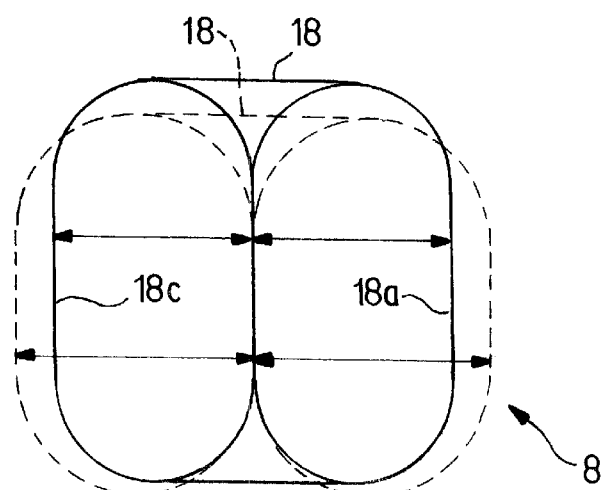
FIG. 6 is a schematic depiction of the change in the pressure chamber cross-sections of the actuating drive of FIG. 1, where the two extreme operating conditions of the drive have been overlapped.
Figure 7:
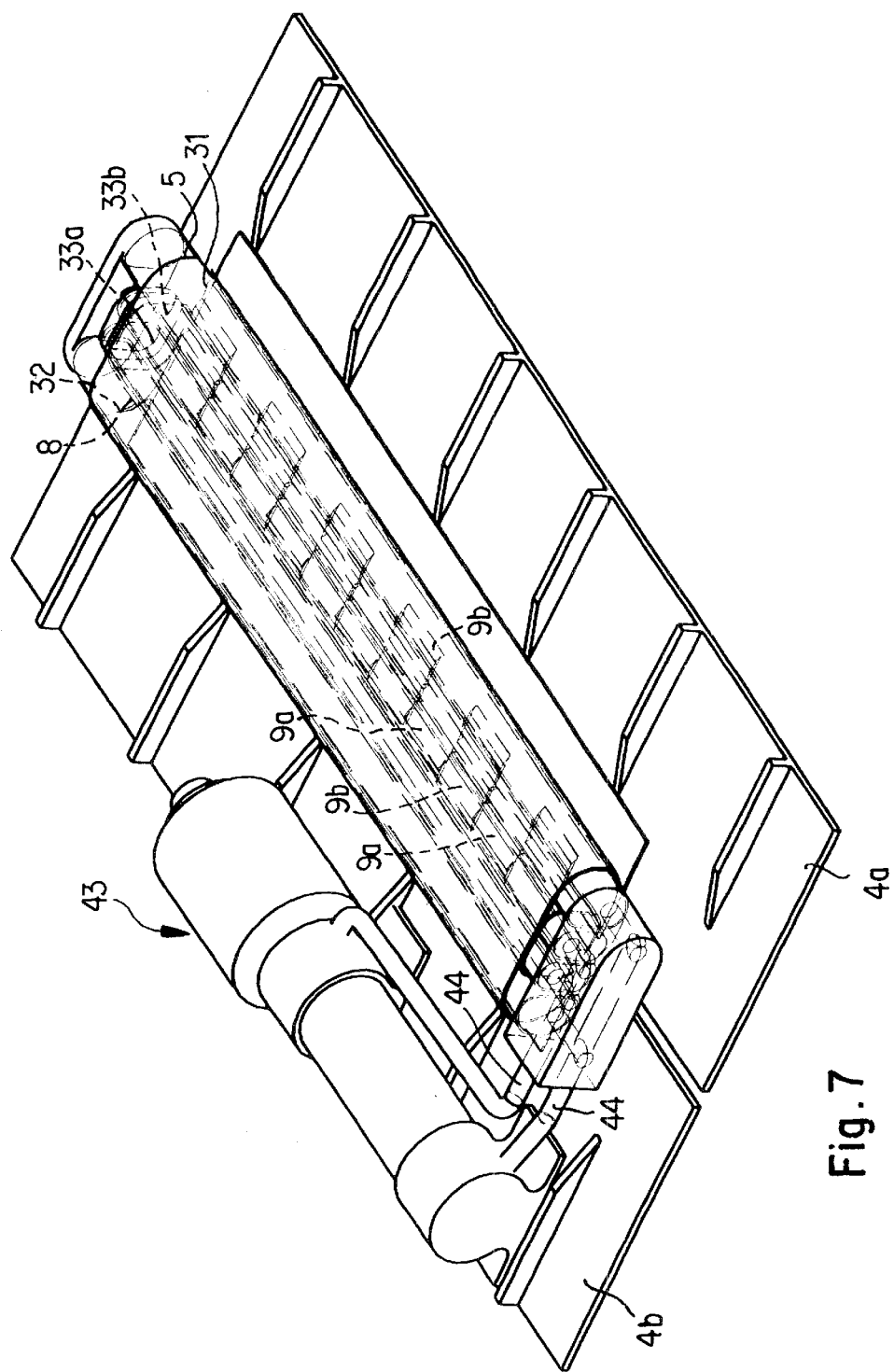
FIG. 7 shows the pressure agent supply to the actuating drive as per FIG. 1.

The changes in volume required to achieve the desired adjusting movement in the inner housing 8 have been shown in FIG. 6; however the swivelling movements of the lateral walls 18*a*, 18*c* have not been shown. In order to guarantee the pressing of the first and second hoses 31, 32 or of the first intermediate hose 33*a* and the second one 33*b*, a suitable supply system is necessary for the pressurizing agent in accordance with the state of the art. The connection of the actuating drive 2 in the embodiment with two intermediate hoses 33*a*, 33*b* in the inner housing 8 and an external housing 5 has been shown in FIG. 7. A hydraulic motor 43 can be provided, corresponding to the state of the art, to supply the fluid or the pressurizing agent in or out of the actuating drive 2. (A hydraulic fluid or gas can be used as pressurizing agent.) Conduits 44 should be provided between the fluid motor 43 and the inner housing 8 or if required, leading to the intermediate hoses 33*a*, 33*b* as in the existing example, as well as to both the parts of the outer housing 5 lateral to the inner housing 8.

Figure 8:
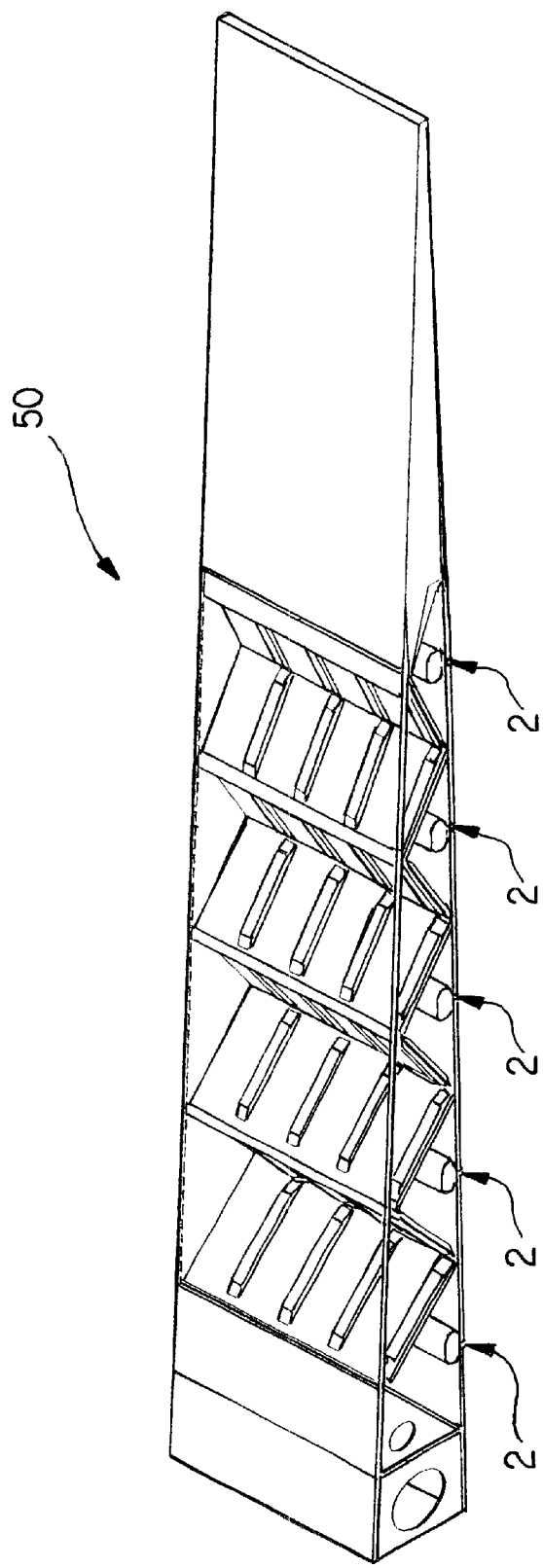
FIG. 8 shows an application of the actuating drive according to the invention, for changing the shape of a part of an airfoil of an airplane.
Figure 9:
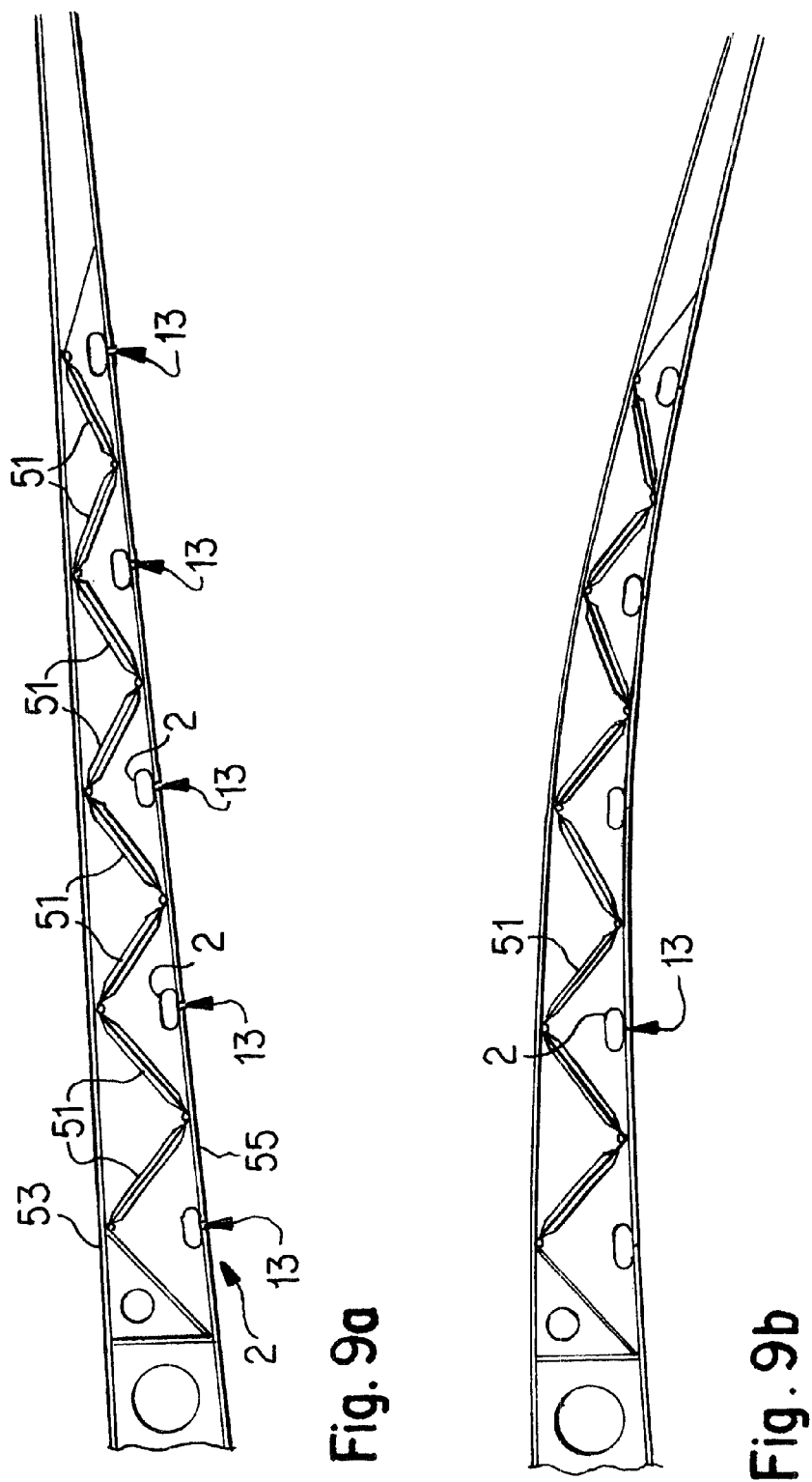
FIG. 9a is a section in the direction of wing depth of the airfoil in FIG. 8, where the airfoil is in its neutral position.
FIG. 9b is a section of the airfoil in FIG. 8, in the direction of its wing depth, where the airfoil is in its maximum changed position.

An example of application of the actuating drive 2 is now described with reference to FIGS. 8, 9*a*, 9*b*. In this example, the actuating drive is integrated in an airfoil of an airplane for changing or adjusting the form of its chord, as shown in FIGS. 9*a*, 9*b*. Rigid supporting walls or props 51 (FIGS. 9*a*, 9*b*) are provided within the airfoil 50, arranged between an upper surface 53 and a lower one 55, which are made of an unexpandable structure. However, the lower surface 55 has grooves 13 as a part of an actuating drive 2. The grooves 13 divide the lower surface 55 into sections 57; and run transverse to the direction of the extension or reduction of the lower surface 55 caused by the actuating drive 2, in order to bring about a change in the wing profile when the surface of the upper surface 53 remains constant (comparison of FIGS. 9*a* and 9*b*). The walls or supports 51 separate the upper surface 53 from the lower one 55, keeping the distance between them constant.

In order to change the profile of an airfoil from a starting status (as shown in FIG. 9*a*) to a changed status (as shown in FIG. 9*b*), the grooves 13 are reset by actuating the actuating drive 2. Since the upper surface 53 remains constant in the direction of the profile depth, the profile changes in the manner shown in FIG. 9*b*.

Figure 10:
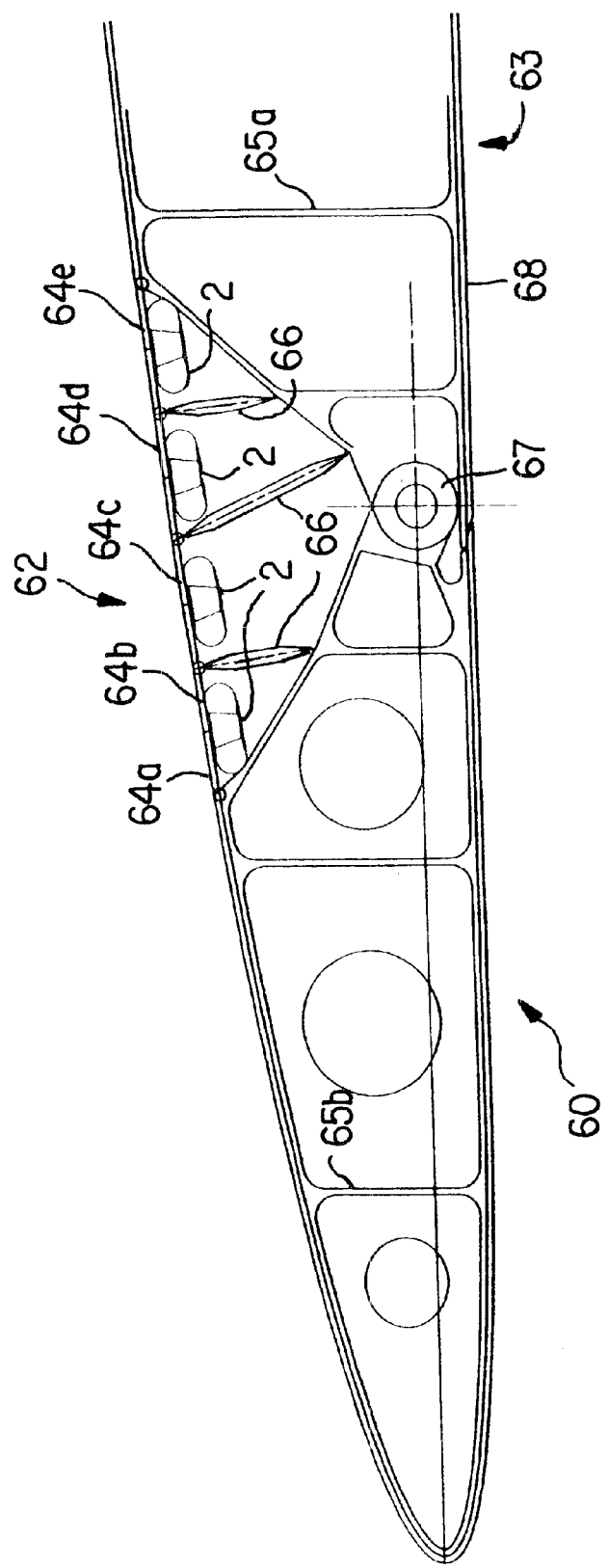
FIG. 10 is an example of application of the actuating drive according to the invention, for moving a droop flap which is part of the airfoil, where the droop flap is shown in its neutral position.
Figure 11:
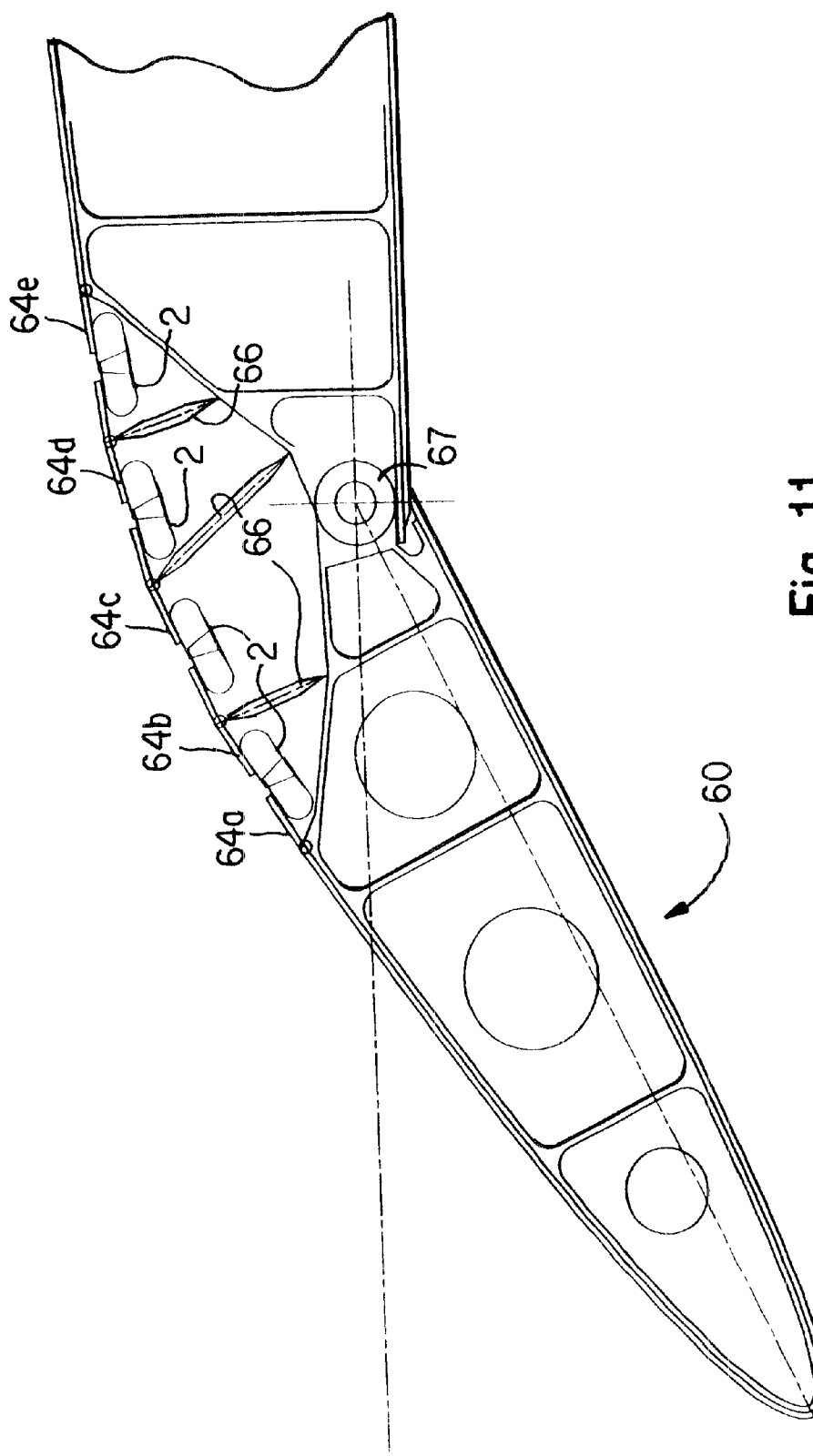
FIG. 11 shows the apparatus of FIG. 10, where the droop flap is in a deflected position.

Another example of application of the actuating drive 2 according to the invention is shown in FIGS. 10 and 11. Here, it has been used as a part of an airfoil for moving a droop flap 60, which can also function as a leading edge. This application is also possible for any area at any point on an airfoil. At least one actuating drive 2 is installed on one side of the plank 61, on which the airfoil is to be bent for executing the adjusting movements of the droop flap 60, i.e. in the transition area 62 between the basic structure of the airfoil 63 and the droop flap 60. As described with reference to FIGS. 1 to 6, the actuating drive 2 is arranged on the inner side of the outer shell/hull 61 for moving the structural parts 64*a*, 64*b*, 64*c*, 64*d*, 64*e* against one another in order to activate the droop flap 60.

Generally, the basic structure 63 as well as the droop flap 60 has an internal structure 65*a* or 65*b* for supporting the same. The transition area 62 of the outer shell 61 is supported with supporting elements 66 on these internal structures 65*a*, 65*b*. For balancing the movements of the outer shell 61 on activating at least one actuating drive 2, the inner structures 65*a*, 65*b* of the supporting elements 66 should have pivot bearings (not shown in detail). If the actuating drive 2 is provided only on one side of the droop flap 60, a pivot bearing 67 can be installed on the opposite side of the airfoil or on the opposite outer shell 68 of the airfoil. An adjusting position of the droop flap has been shown in FIG. 11.

The functioning described with the help of a droop flap can be used for all types of adjusting surfaces, e.g., for trailing edge flaps, spoilers, flippers or vertical rudders.

Figure 12:
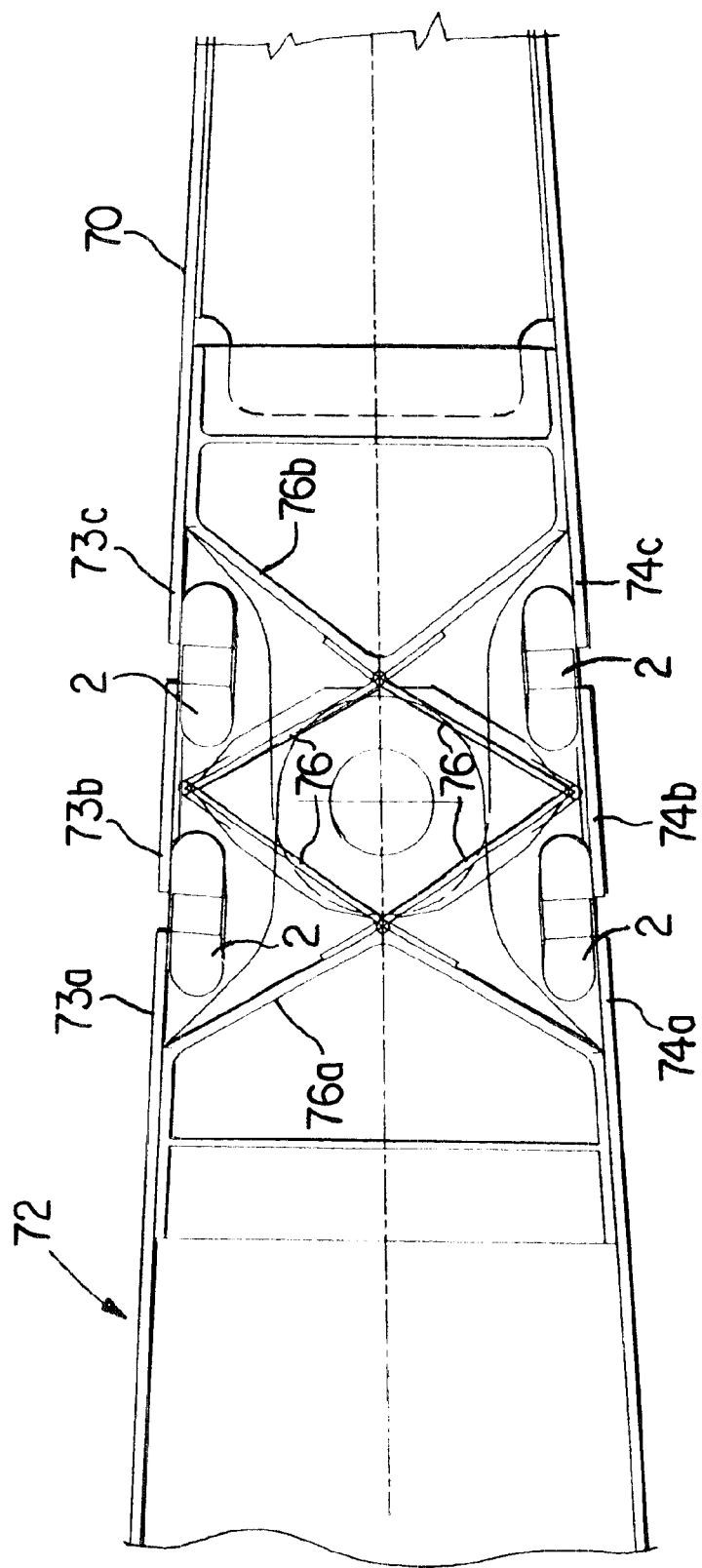
FIG. 12 shows another application of the actuating drive according to the invention, for operating the trailing edge flap, which is shown in the neutral position.
Figure 13:
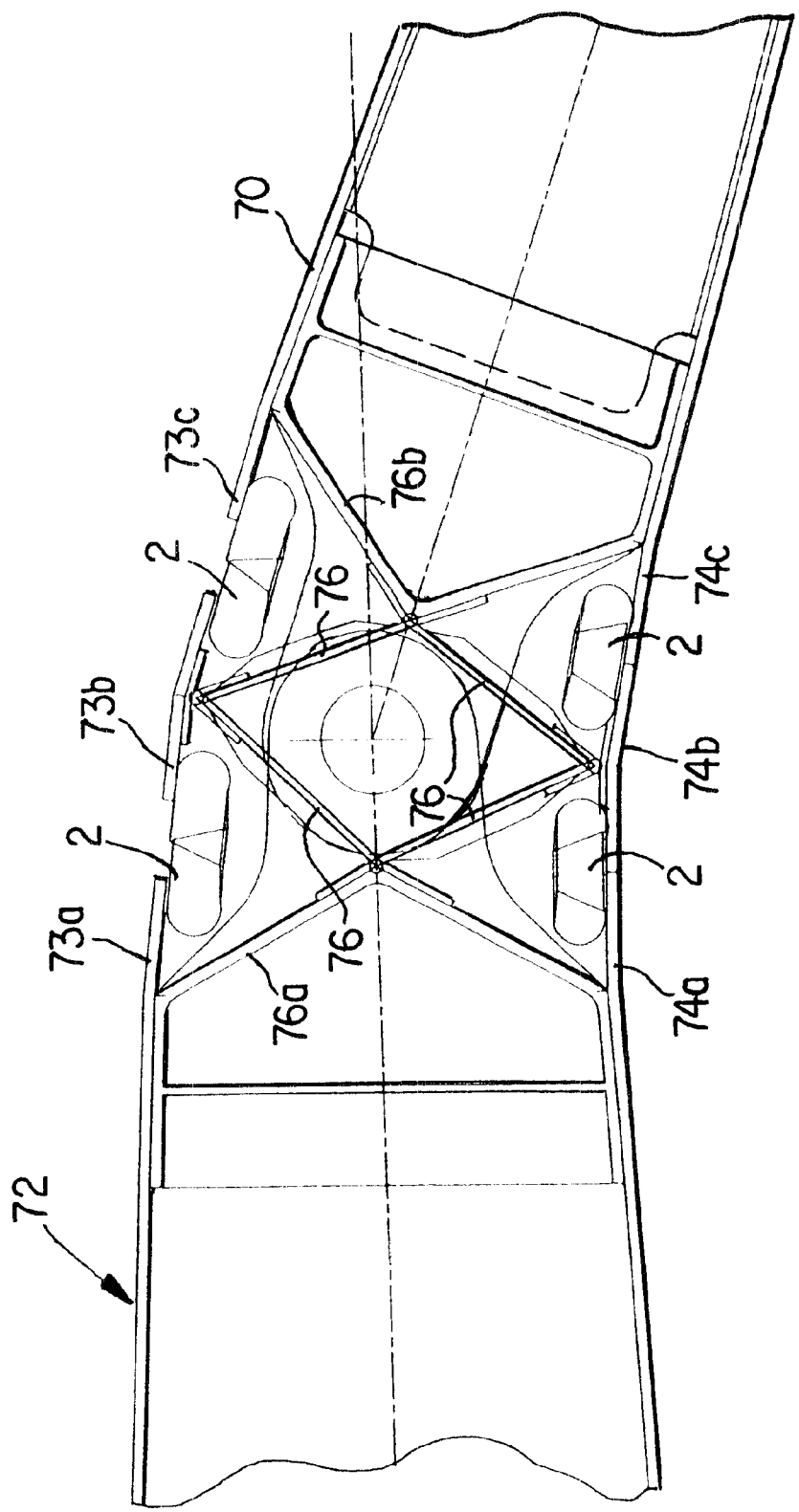
FIG. 13 shows the apparatus of FIG. 12, with the trailing edge flap in a deflected position.

Another application of the actuating drive according to the invention is shown in FIGS. 12 and 13, which illustrates the example of a trailing edge flap 70. The trailing edge flap 70 has been shown in the neutral position in FIG. 12 and in a recessed position in FIG. 13. The actuating drive 2 has been installed on both the opposite outer shells 71*a*, 71*b* of the transition area 71 between the main body 72 of the wing and the trailing edge flap 70. Corresponding structural parts 73*a*, 73*b*, 73*c* or 74, 74*b*, 74*c* are pushed against one another on both sides 71*a*, 71*b* by activating the actuating drive 2; this can be seen by comparison of FIGS. 12 and 13. The external shells 71*a*, 71*b* are supported by supporting elements 76 on an internal airfoil structure 76*a* and an internal flap structure 76*b*. The supporting elements 76 are fitted with swivelling bearings on the external shells 71*a*, 71*b* and the inner structures 76*a*, 76*b* for balancing the deflection movements. These bearings need not necessarily be pivot bearings. They can also be designed as flexible bearings.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fluid actuated drive for relative movement of first and second structural parts across a gap separating said parts, said drive having a first housing with a pressurizing agent therein, said first housing running along a longitudinal direction of the gap; wherein:

a width of the gap depends upon relative positions of side walls of the first housing which face each other, and which are movable toward and away from each other by adjusting pressure of the pressurizing agent for movement of the structural parts;

an inner part of the first housing contains a flexible hose; and each of the side walls of the first housing is connected with a respective one of said structural parts which is on an opposite side of the gap, intermittently along the longitudinal direction of the gap.

2. The fluid actuating drive according to claim 1, further comprising an external housing disposed outside of the first housing, with side walls connected to the side walls of the first housing, each of said side walls of said external housing also being connected to a respective one of said structural parts; wherein:

an area between the first housing and the outer housing is coupled to receive pressurizing agent;

the first flexible hose has a negligible elongation capacity and additional flexible hoses with negligible elongation capacity are laid in the longitudinal direction laterally to the first housing in a space between the first housing and the second housing on each side of the first housing; and walls of the outer housing are fixed to the first housing in such a manner that movement of the side walls of the first housing takes place by circulating the pressurizing agent between the first flexible hose and the additional flexible hoses.

3. The fluid actuating drive according to claim 1, wherein an inside of the first housing is filled by the first flexible hose.

4. The fluid actuating drive according to claim 2, wherein an inside of the first housing is filled by the first flexible hose.

5. The fluid actuating drive in accordance with claim 1, wherein:

the first flexible hose has a negligible elongation capacity; and at least a second flexible hose with a negligible elongation capacity is installed in a longitudinal direction of the first housing in an area between the first housing and an outer housing, whereby a horizontal swinging of the side walls of the first housing takes place with the circulation of a pressurizing agent between the first flexible hose and the at least a second flexible hose.

6. An actuating drive for relative translational movement of first and second structural parts which are separated by a longitudinal space, comprising:

a housing disposed longitudinally along said longitudinal space, said housing having opposing longitudinal sides which are movable toward and away from each other in a direction transverse to said longitudinal space by controlling pressure in a pressurizing medium in an interior of said housing;

wherein said housing has first and second mounting surfaces, which mounting surfaces are adapted to be fixedly mounted respectively to said first and second structural parts, are divided in a direction transverse to said longitudinal space, forming substantially parallel segments which are connected alternately to respective ones of said longitudinal sides, for movement in opposite directions transverse to said longitudinal space.

7. A fluid actuated drive for relative movement of first and second structural parts across a gap separating said parts, said drive comprising:

a first housing running along a longitudinal direction of the gap and having sidewalls which face each other; and a first flexible hose disposed in an inner part of the first housing and having a pressurizing agent therein, such that the sidewalls of the first housing are movable toward and away from each other by adjusting pressure of the pressurizing agent for movement of the structural parts; wherein each of the side walls of the first housing is connected with a respective one of the first and second structural parts which is on an opposite side of the gap from the sidewall to which it is connected, whereby a width of the gap depends upon relative positions of the side walls.

8. A fluid actuated drive for relative movement of first and second structural parts which are separated by a longitudinally extending gap, said drive comprising:

an elongate first housing disposed longitudinally adjacent said gap and having opposingly disposed first and second longitudinally extending side walls, each of which side walls has a plurality of fingers extending therefrom in a direction substantially transverse to said gap, said fingers extending from said first side wall being interdigitated with the fingers extending from said second side wall, forming an elongate first interior space within said first housing, with extremities of said fingers extending from said first side wall being connected to said second structural part, and extremities of said fingers extending from said second side wall being connected to said first structural part along said gap; and a first flexible member disposed in said first interior space and having a pressurizing agent therein such that said walls of the first housing are movable toward and away from each other by varying pressure of the pressurizing agent.

9. The fluid actuated drive according to claim 8, further comprising:

a second housing disposed outwardly of said first housing, and connected longitudinally to said first and second parts at opposite extremities thereof, forming second interior spaces laterally adjacent said side walls of said first housing; and second flexible members disposed in said second interior spaces and having pressurizing agent therein for adjusting transverse dimensions of said second flexible members.

10. The fluid actuated drive according to claim 9, wherein said pressurizing agent in said first flexible member is in fluid communication with said pressurizing agent in said second flexible members, for relative pressure adjustment of said pressurizing medium in said first and second flexible members.

* * * * *